(12) United States Patent
Twelves, Jr. et al.

(10) Patent No.: US 9,732,632 B2
(45) Date of Patent: Aug. 15, 2017

(54) MULTI-COMPONENT FASTENER AND METHOD OF PRODUCING THE SAME

(71) Applicant: United Technologies Corporation, Hartford, CT (US)

(72) Inventors: Wendell V. Twelves, Jr., Glastonbury, CT (US); Donald W. Peters, Colchester, CT (US); Evan Butcher, Manchester, CT (US); Lexia Kironn, Rocky Hill, CT (US); Joe Ott, Enfield, CT (US); Kathleen E. Sinnamon, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 188 days.

(21) Appl. No.: 14/604,406

(22) Filed: Jan. 23, 2015

(65) Prior Publication Data

US 2016/0215811 A1   Jul. 28, 2016

(51) Int. Cl.

| F16B 35/04 | (2006.01) |
|---|---|
| F01D 25/24 | (2006.01) |
| F16B 33/00 | (2006.01) |
| F01D 25/26 | (2006.01) |
| F02K 1/82 | (2006.01) |

(52) U.S. Cl.
CPC ......... *F01D 25/243* (2013.01); *F01D 25/265* (2013.01); *F02K 1/822* (2013.01); *F16B 33/006* (2013.01); *F16B 35/041* (2013.01); *F05D 2230/642* (2013.01); *F05D 2260/31* (2013.01); *F05D 2300/43* (2013.01); *F05D 2300/5021* (2013.01); *F05D 2300/6033* (2013.01); *Y02T 50/675* (2013.01)

(58) Field of Classification Search
CPC ... F16B 35/041; F16B 33/006; F16B 25/0094
USPC .......................................... 411/383, 424, 901
See application file for complete search history.

(56) References Cited

U.S. PATENT DOCUMENTS

| 4,126,338 | A | * | 11/1978 | Coel | F16L 47/04 |
|---|---|---|---|---|---|
| | | | | | 285/330 |
| 4,718,801 | A | * | 1/1988 | Berecz | B64D 45/02 |
| | | | | | 411/378 |
| 4,975,014 | A | * | 12/1990 | Rufin | F16B 35/00 |
| | | | | | 403/30 |
| 5,090,857 | A | * | 2/1992 | Dunn | F16B 33/006 |
| | | | | | 411/354 |
| 5,634,754 | A | * | 6/1997 | Weddendorf | F16B 13/065 |
| | | | | | 411/354 |

(Continued)

*Primary Examiner* — Flemming Saether
(74) *Attorney, Agent, or Firm* — O'Shea Getz P.C.

(57) ABSTRACT

A multi-component fastener is provided having a body and a sleeve. The body has a shank that extends lengthwise between a head and a distal end. The shank includes a first outer surface. The body includes a first material. The sleeve has a wall defined by an outer surface and an inner surface. The inner surface defines an interior cavity. The wall extends lengthwise between a first end and a second end. At least a portion of the sleeve outer surface contiguous with the first end is threaded. The sleeve includes a second material that is dissimilar to the first material. A portion of the shank including the distal end is disposed within the interior cavity of the sleeve. The sleeve and the shank are fixed to one another.

17 Claims, 3 Drawing Sheets

(56) References Cited

U.S. PATENT DOCUMENTS

| | | | | |
|---|---|---|---|---|
| 6,045,310 A | * | 4/2000 | Miller | F16B 19/1036 |
| | | | | 411/356 |
| 7,988,395 B2 | * | 8/2011 | Steffier | F16B 3/00 |
| | | | | 411/283 |
| 9,238,339 B2 | * | 1/2016 | Blom | B29C 70/462 |
| 2016/0169261 A1 | * | 6/2016 | Peters | F16B 33/004 |
| | | | | 411/383 |

* cited by examiner

MULTI-COMPONENT FASTENER AND METHOD OF PRODUCING THE SAME

BACKGROUND OF THE INVENTION

1. Technical Field

The present disclosure relates to fasteners in general, and to fasteners that are adapted to accommodate environmental conditions (e.g. thermal, electrical, chemical, etc.) in particular.

2. Background Information

Fasteners are a known mechanism for attaching components together. In many instances, fasteners (bolts, screws, etc.) are made from a single material and the characteristics of the fastener material dictate the performance and durability of the fastener in a given application. In some applications, a portion of a fastener (e.g., a bolt head) may be exposed to a first set of environmental conditions and the opposite end of the fastener may be exposed to a second set of environmental conditions; e.g., a bolt head may be exposed to a high temperature environment and the threaded portion of the bolt may be exposed to a lower temperature environment. For example, gas turbine engines include an axially extending internal gas path that extends from an ambient air inlet to an exhaust where air and combustion products exit the engine. At particular points in the gas path (e.g. at or downstream of the point where combustion occurs), gases traveling within the gas path are often at a very high temperature; i.e., temperatures where the material properties (e.g., yield stress, etc.) of metallic liners and/or fasteners may be compromised, or the material subject to high temperature oxidation. In these instances, the durability and/or strength of the metallic component may be limited. To remedy the situation, it is known to use liner panels made of ceramic or ceramic matrix composite materials, which materials have substantially greater thermal capabilities. The ceramic liner panels attach to an outer panel and an annulus is formed between the ceramic liner panels and the outer panel. Typically, cooling air is directed through the annulus to cool the back side of the ceramic liner panels and the fasteners that hold the ceramic liner panels to the outer panel. When ceramic panels rather than metal panels with film cooling holes are employed as a flow path liner, a significant reduction in cooling air is required. This enables improved engine efficiency. Hence, a fastener that extends through a ceramic liner panel and an outer panel may have a first portion exposed to high temperature core gas path gases and another portion exposed to relatively cooler cooling gas.

In other applications, a fastener made from a single material may provide an undesirable energy path; e.g., most metallic fasteners are conductive of electrical energy and/or thermal energy. Using a fastener made solely from a non-conductive material (e.g., polymer or ceramic) may eliminate the undesirable energy path, but may raise different issues (e.g. susceptibility to fracture, durability, strength, etc.). Furthermore, a fastener made from a single material may have a limited useful life in certain chemical environments (e.g. caustic, corrosive, etc.), and materials that are adapted to operate in such environments may not possess sufficient mechanical properties (e.g. yield strength, etc.) to function as a fastener.

SUMMARY OF THE INVENTION

According to one aspect of the present disclosure, a multi-component fastener is provided having a body and a sleeve. The body has a shank that extends lengthwise between a head and a distal end. The shank includes a first outer surface. The body comprises a first material. The sleeve has a wall defined by an outer surface and an inner surface. The inner surface defines an interior cavity. The wall extends lengthwise between a first end and a second end. At least a portion of the sleeve outer surface contiguous with the first end is threaded. The sleeve comprises a second material that is dissimilar to the first material. A portion of the shank including the distal end is disposed within the interior cavity of the sleeve. The sleeve and the shank are fixed to one another.

In a further embodiment of the foregoing embodiment, the sleeve and the shank are fixed to one another in a manner that disallows relative movement between the body and sleeve other than movement attributable to relative thermal expansion or thermal contraction.

In a further embodiment of any of the foregoing embodiments of the present disclosure, the shank includes at least one channel disposed in the first outer surface.

In a further embodiment of any of the foregoing embodiments of the present disclosure, the at one least channel extends a distance around a circumference of the shank.

In a further embodiment of any of the foregoing embodiments of the present disclosure, the sleeve includes a male feature received within the at least one channel.

In a further embodiment of any of the foregoing embodiments of the present disclosure, the fastener further includes a retainer operable to retain the sleeve male feature within the channel disposed in the first outer surface of the channel.

In a further embodiment of any of the foregoing embodiments of the present disclosure, the channel disposed in the first outer surface of the shank has a cross-sectional geometry and the sleeve male feature has a cross-sectional geometry that mates with the cross-sectional geometry of the channel in a manner that allows for relative thermal expansion or thermal contraction without binding there between.

In a further embodiment of any of the foregoing embodiments of the present disclosure, the channel is defined by a first side wall surface, a second side wall surface, and a base wall surface, and the first and second side wall surfaces each extend along a line that is non-perpendicular to a lengthwise extending axis of the body.

In a further embodiment of any of the foregoing embodiments of the present disclosure, the sleeve wall is configured to include a plurality of fingers, each finger separated from another finger by a slot disposed within the wall.

In a further embodiment of any of the foregoing embodiments of the present disclosure, the shank includes at least one lengthwise extending slot disposed therein, and one of the sleeve wall fingers is disposed in the slot.

In a further embodiment of any of the foregoing embodiments of the present disclosure, the sleeve wall finger has a cross-sectional geometry and the lengthwise extending slot disposed in the shank has a cross-sectional geometry that mates with the cross-sectional geometry of the finger in a manner that allows for relative thermal expansion or contraction without binding there between.

In a further embodiment of any of the foregoing embodiments of the present disclosure, the first outer surface is disposed at a first diameter relative to a lengthwise extending axis of the body, and the shank further includes a second outer surface disposed at a second diameter relative to the lengthwise extending axis of the body, wherein the second diameter is larger than the first diameter.

In a further embodiment of the above embodiment of the present disclosure, the sleeve wall is configured to include a plurality of fingers, each finger separated from another finger by a slot disposed within the wall, and the shank includes at least one lengthwise extending slot disposed in the second outer surface, and one of the sleeve wall fingers is disposed in the slot.

In a further embodiment of any of the foregoing embodiments of the present disclosure, the body first material comprises at least one of a ceramic or a ceramic matrix composite material, and the sleeve second material comprises a metallic material.

In a further embodiment of any of the foregoing embodiments of the present disclosure, the body comprises a polymeric material and the sleeve comprises a metallic material.

According to another aspect of the present invention, a liner panel assembly is provided. The liner panel includes one or more liner panels, an outer panel, and a plurality of multi-component fasteners each operable to hold the liner panel to the outer panel. Each fastener includes a body and a sleeve. The body has a shank that extends lengthwise between a head and a distal end. The shank includes a first outer surface. The body comprises a first material. The sleeve has a wall defined by an outer surface and an inner surface, and the inner surface defines an interior cavity. The wall extends lengthwise between a first end and a second end. At least a portion of the sleeve outer surface contiguous with the first end is threaded. The sleeve comprises a second material that is dissimilar to the first material. A portion of the shank including the distal end is disposed within the interior cavity of the sleeve. The sleeve and the shank are fixed to one another.

In a further embodiment of the foregoing embodiment of the present disclosure, each fastener body comprises at least one of a ceramic or a ceramic matrix composite material, and each sleeve comprises a metallic material.

According to another aspect of the present disclosure, a multi-component fastener is provided that includes a body and a sleeve material. The body has a shank that extends lengthwise between a head and a distal end. The shank includes a first outer surface having a threaded portion that extends from the distal end. The body comprises a first material. The sleeve material is disposed only on the body shank. The sleeve material contiguous with the shank threaded portion has an outer surface that is threaded, and the sleeve material comprises a second material. The first material is a ceramic material or a ceramic matrix composite material, and the sleeve material is metallic.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Embodiments of the present multi-component fastener are described hereinafter. In some of those embodiments, the fastener includes a body and a sleeve. The body has a shank that extends lengthwise between a head and a distal end, and has a lengthwise extending rotational axis. The sleeve has a wall defined by an outer surface and an inner surface and extends lengthwise between a first end and a second end. The inner surface defines an interior cavity. At least a portion of the sleeve outer surface contiguous with the first end is threaded. The geometries of the shank and the sleeve are such that the shank is receivable within the interior cavity of the sleeve. The shank and sleeve are configured so that once coupled, the sleeve and shank are not intended to be lengthwise disengaged, and/or rotated about the lengthwise axis relative to one another during use; i.e. the shank and sleeve are "fixed" relative to one another other than relative movement attributable to differences in thermal expansion or contraction. The present multi-component fastener may assume different configurations to suit different applications. For example, the shank is comprised of a first material and the sleeve is comprised of a second material. The first and second materials are different from one another and have different material and mechanical properties. To illustrate the utility of the present multi-component fastener, specific examples of fastener configurations are provided hereinafter.

Figure 1:
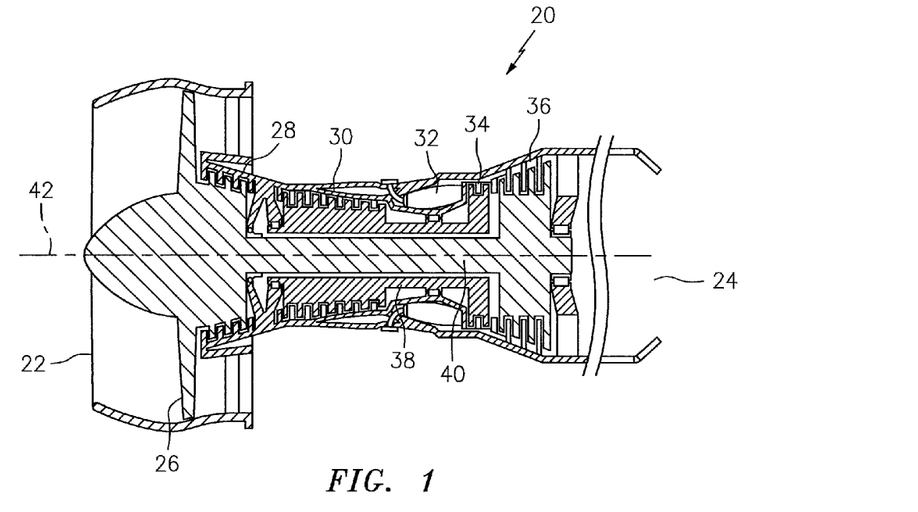
FIG. 1 is a diagrammatic sectional view of a gas turbine engine.

As indicated above, a gas turbine engine 20 includes an axially extending internal gas path that extends from an ambient air inlet 22 to an exhaust 24 where air and combustion products exit the engine 20. For example, as can be seen in FIG. 1, a gas turbine engine 20 may include a fan section 26, a low pressure compressor (LPC) section 28, a high pressure compressor (HPC) section 30, a combustor section 32, a high pressure turbine (HPT) section 34, and a low pressure turbine (LPT) section 36. When the gas turbine engine 20 is assembled, a high pressure shaft 38 connects the HPC 30 to the HPT 34, and a low pressure shaft 40 connects the LPC 28 to the LPT 36. The fan section 26 may be connected to the low pressure shaft, a third shaft, or may be connected to the low pressure shaft via a geared arrangement. The shafts typically rotate about an axially extending central axis 42 of the engine.

Figure 2:
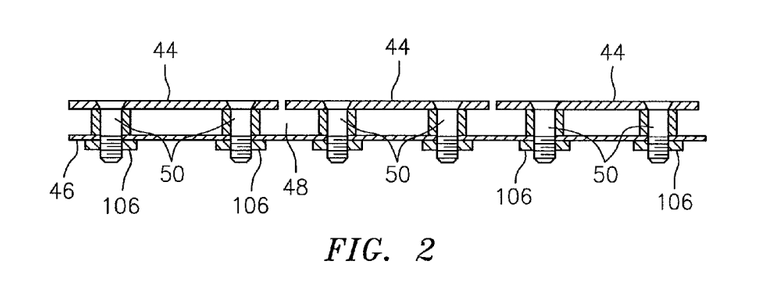
FIG. 2 is a diagrammatic sectional view of a liner section.

Now referring to FIG. 2, at particular points in the gas path (e.g. at or downstream of the point where combustion occurs), the inner gas path is defined by liner panels 44, which panels 44 are typically made of (or coated with) ceramic or ceramic matrix composite materials. The liner panels 44 attach to an outer panel 46 and an annulus 48 is formed between the liner panels 44 and the outer panel 46. Typically, cooling air is directed through the annulus 48. A non-limiting embodiment of the present multi-component fastener 50 described below may be used to hold the liner panels 44 to the outer panel 46.

Referring to FIGS. 3-8, the aforesaid embodiment of the present multi-component fastener 50 includes a body 52 and a sleeve 54. The body 52 has a shank 56 that extends lengthwise between a head 58 and a distal end 60, and has a lengthwise extending rotational axis 62. This embodiment is disclosed below in terms of a cylindrical configuration, but the fastener 50 is not limited to a cylindrical configuration. The shank 56 has a first outer surface 64 disposed at a first diameter 66 relative to the axis 62 and a second outer surface 68 disposed at a second diameter 70 relative to the axis 62. The second diameter 70 is larger than the first diameter 66. As indicated above, the embodiment illustrated in FIGS. 3-8 represents a non-limiting example; e.g. the shank 56 may have a single outer surface, or more than two outer surfaces. The head 58 of the body 52 is shown in the FIGURES as having a tapered flat head configuration. Although there may be advantages to a tapered flat head configuration in some applications, the present disclosure is not limited to such a configuration; e.g., the head 58 may have a square head configuration, a hex head configuration, etc. The configuration of the head 58 may be chosen to facilitate certain body material choices; e.g., a square head may be favorable for certain materials because it avoids features having an inherent stress riser, potential crack initiator. The head 58 may include one or more features that enable the body 52 to be held constant relative to a rotating nut 106 or vice versa (e.g., see FIG. 2). Such features include a wrench flat, a slot, a hex recess, spanner wrench holes, etc. In some embodiments, the shank 56 may include one or more features (e.g. wrench flats, etc.) that enable the body 52 to be held constant relative to a rotating nut 106 or vice versa.

As indicated above the shank 56 and sleeve 54 are configured so that once coupled, the sleeve 54 and shank 56 are intended to be "fixed" to one another in a manner that prevents lengthwise disengagement and relative rotation about the lengthwise axis 62 during use. Alternatively stated in terms of a load applied to the fastener, the shank 56 and sleeve 54 are configured so that the shank 56 and sleeve 54 will remain fixed to one another when a design limit mechanical load (e.g., torque, axial, etc.) is applied to the fastener; i.e. a loading at or below the rated capacity of the fastener 50. The term "fixed" as used herein does not mean that there cannot be any relative movement between the shank 56 and sleeve 54. Embodiments of the present multi-component fastener 50 may include components comprised of dissimilar material, each material having a coefficient of thermal expansion ("CTE") different from that of another component. Hence, when the fastener 50 is heated from an ambient temperature to an elevated temperature, the components 52, 54 may expand at different rates and may experience some relative movement via thermal expansion and contraction. To "fix" the shank 56 and sleeve 54 together but allow for thermal expansion and contraction, the shank 56 and sleeve 54 may have one or more mating male and female features that cooperate with one another to prevent relative circumferential rotation about the lengthwise axis 62 between the sleeve 54 and shank 56, and one or more mating male and female features that cooperate with one another to prevent relative lengthwise movement between the sleeve 54 and shank 56. Of course, the present disclosure contemplates that the same features may be used to prevent relative lengthwise and rotational movement, other than that attributable to thermal expansion and contraction. Non-limiting examples of acceptable male and female features are described below. It should be noted that the respective male and female features of the shank 56 and sleeve 54 may be alternatively provided with the other of the shank 56 and sleeve 54.

Figure 3:
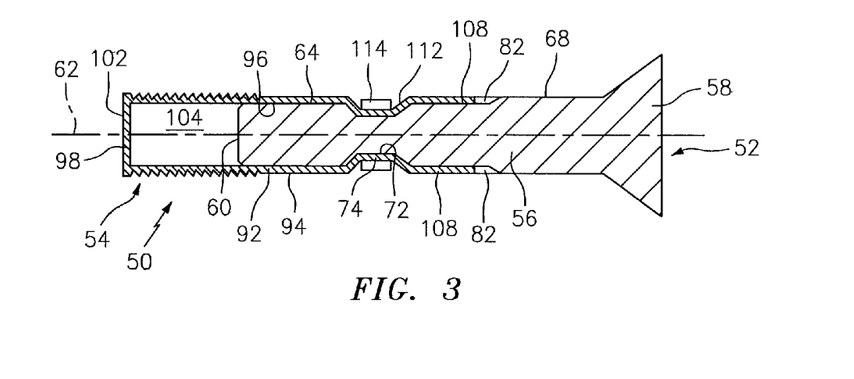
FIG. 3 is a diagrammatic sectional view of an embodiment of the present multi-component fastener.
Figure 4:
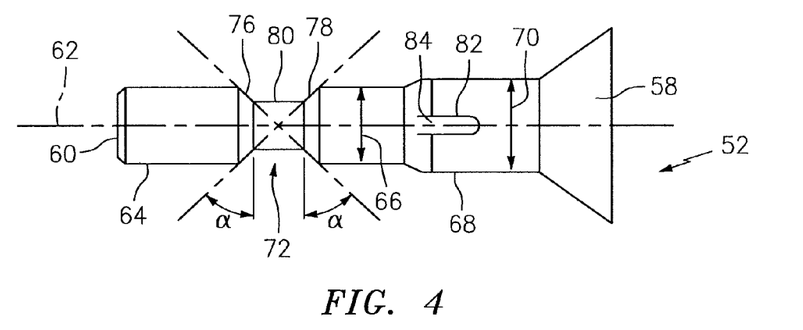
FIG. 4 is a top diagrammatic view of a fastener body embodiment.

As a first example, the shank 56 may include a channel 72 (i.e. a female feature) disposed in the first outer surface 64 configured to receive a sleeve male feature 74 as will be described below. In the embodiment shown in FIG. 6, one side of the channel 72 is contiguous with the second outer surface 68. In the embodiment shown in FIG. 7, the channel 72 is spaced apart from the intersection of the first and second outer surfaces 64, 68. The specific location of the channel 72 relative to the shank 56 can be varied to suit the application. The channel 72 has cross-sectional geometry defined by a first side wall surface 76, a second side wall surface 78, and a base wall surface 80. The channel 72 extends along a circumferential axis. In the embodiment shown in FIGS. 3, 4, 6, and 7, the channel 72 extends around the entire circumference of the shank 56. In alternative embodiments, the channel 72 may extend around less than the entire circumference of the shank 56, and also may include more than one channel 72 section; e.g., independent channel 72 sections (or sections with other void geometries) disposed at spaced apart circumferential positions. The base wall surface 80 is disposed at a diameter relative to the axis 62 that is less than the diameter of the first outer surface 64; i.e. the channel 72 defines a void within the shank 56. In a preferred embodiment, the channel side walls 76, 78 are disposed at a non-perpendicular angle relative to the axis 62 of the shank 56; i.e. the channel side walls 76, 78 are not parallel one another. For example, as shown in FIG. 4, each side wall 76, 78 may be disposed at an angle "α" relative to a line perpendicular to the lengthwise extending shank axis 62. Preferably the angle "α" is such that imaginary lines extending along the channel side wall surfaces 76, 78 intersect at the shank axis 62. The channel 72 is not, however, limited to this embodiment.

Figure 6:
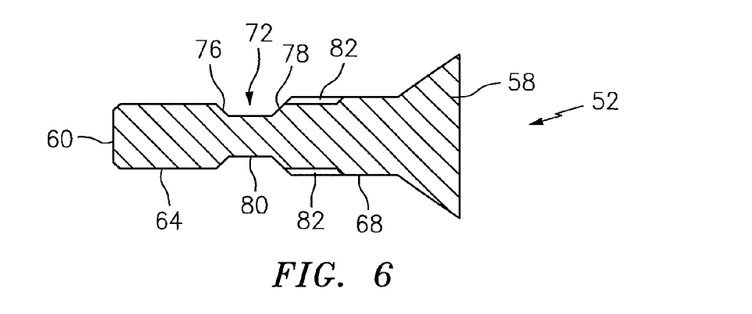
FIG. 6 is a sectional view of a fastener body embodiment.
Figure 7:
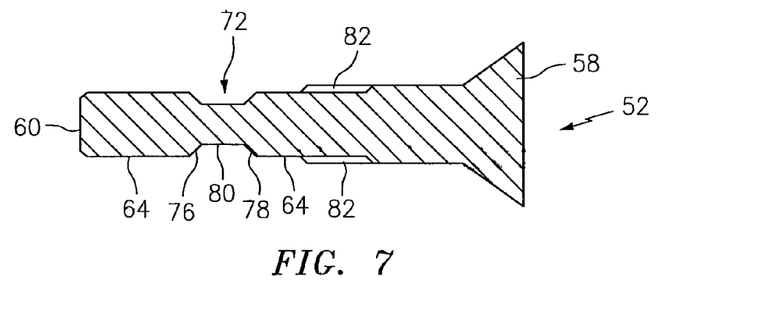
FIG. 7 is a sectional view of a fastener body embodiment.
Figure 8:
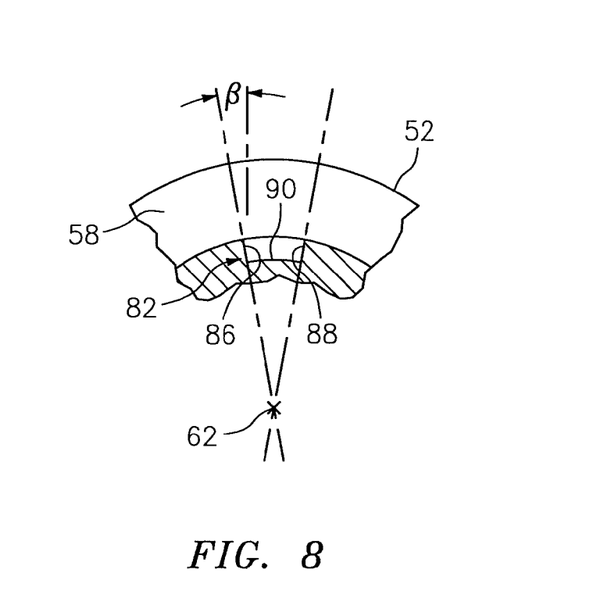
FIG. 8 is a partial sectional view of a slot shown in FIG. 4.

As a further example, the shank 56 may include at least one lengthwise extending slot 82 (e.g. disposed in the second outer surface 68), which slot 82 is configured to receive a feature of the sleeve 54 (e.g. a finger 108). The slot 82 may include an open end 84 and extends a distance lengthwise toward the head 58. The slot 82 has a cross-sectional geometry defined by a first side wall surface 86, a second side wall surface 88, and a base wall surface 90. The base wall surface 90 is disposed at a diameter relative to the axis 62 that is less than the diameter of the second outer surface 68; i.e. the slot defines a void within the shank 56. Preferably, the slot base wall surface 90 is disposed at a diameter that is equal to the diameter of the first outer surface 64. In a preferred embodiment, the slot side walls 86, 88 are each disposed at an angle relative to the axis 62 of the shank 56; i.e. the slot side walls 86, 88 are not parallel one another. For example, as shown in FIG. 8, each side wall 86, 88 may be disposed at an angle "β", so that a circumferential width of the slot 82 at the base wall surface 90 is less than the circumferential width of the slot 82 at the second outer surface 68. Preferably the angle "β" is such that imaginary lines extending along the slot side wall surfaces 86, 88 intersect at the shank axis 62. The slot 82 is not, however, limited to this particular configuration. The embodiments shown in FIGS. 6 and 7 illustrate shank 56 examples having a plurality of slots 82 disposed in the second outer surface 68.

The fastener body 52 may be comprised of different materials suitable for different applications. In terms of an application wherein a portion of the fastener body 52 is exposed to a substantially higher temperature than the fastener sleeve 54, the fastener body 52 may be comprised of a material capable of maintaining its mechanical properties (e.g., yield strength, etc.) without oxidation degradation. Examples of acceptable fastener body 52 materials include, but are not limited to, silicon nitride, alumina nitride, zirconia, boron nitride, glass, ceramic matrix composites, ceramic fiber reinforced ceramics, or the like, and polymers (e.g. polyamide, reinforced polymers, etc.) capable of performing within the application temperature range without degradation. In an alternative application, it may be desirable to have a fastener body 52 that is electrically non-conductive. The fastener body materials described above (ceramics, polymers, etc.) may be used where electrically non-conductive properties are desired. In further alternative applications, it may be desirable to have a fastener body 52 that can be used in a chemically detrimental environment (e.g., caustic, corrosive, etc.). The fastener body materials described above (ceramics, polymers, etc.) may be used where chemically resistant properties are desired.

The sleeve 54 has a circumferentially extending wall 92 defined by an outer surface 94 and an inner surface 96, and which wall 92 extends lengthwise between a first end 98 and a second end 100. In the embodiments shown in FIGS. 3 and 5, the first end 98 of the sleeve 54 is closed by an end wall 102. The wall inner surface 96 defines an interior cavity 104. At least a portion of the sleeve outer surface 94 contiguous with the first end 98 is threaded; e.g. threaded to receive a nut 106 (e.g. see FIG. 2). The geometries of the shank 56 and the sleeve 54 are such that the first outer surface 64 portion of the shank 56 is receivable within the interior cavity 104 of the sleeve 54.

Figure 5:
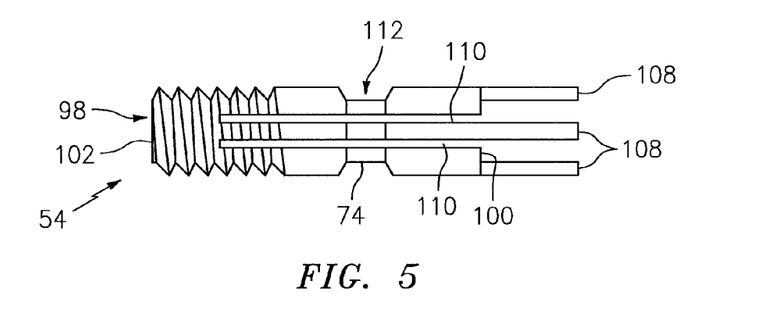
FIG. 5 is a top diagrammatic view of a sleeve embodiment.

In the embodiment shown in FIG. 5, the sleeve wall 92 includes a plurality of fingers 108, each finger 108 separated from another finger 108 by a lengthwise extending slot 110 disposed within the wall 92. In the embodiment shown in FIG. 5, one or more of the fingers 108 extend lengthwise beyond the second end 100. In alternative embodiments, all of the fingers 108 may terminate at the second end 100 of the sleeve 54. The exemplary finger 108 and slot 110 arrangement of the sleeve 54 permits thermal expansion and contraction of the sleeve 54 relative to the shank 56, while still maintaining a "fixed" relationship between the shank 56 and the sleeve 54.

As indicated above, the shank 56 and sleeve 54 may have mating male and female features that cooperate with one another to prevent relative lengthwise movement and/or circumferential rotation between the sleeve 54 and shank 56, other than that attributable to thermal expansion and contraction. In terms of the above example wherein the shank 56 includes a channel 72 disposed in the shank first outer surface 64 configured to have channel side wall surfaces 76, 78 disposed at an angle "α", the sleeve wall 92 may include a mating male feature 74 that is received within the shank channel 72 when the fastener components are assembled; e.g., a male feature 74 having side walls disposed at an angle "α". The mating wall surfaces of the sleeve male feature 74 and the shank channel 72 permit a sleeve 54 having a CTE greater than that of the shank 56 to expand radially and axially without binding within the shank channel 72, while still maintaining a "fixed" relationship between the shank 56 and the sleeve 54. FIGS. 3 and 5 illustrate a male feature 74 formed by the sleeve fingers 108 deflected inwardly with a geometry that mates with the shank channel 72 geometry. In this embodiment, a sleeve channel 112 is formed by the respective outer surfaces of the sleeve fingers 108. The present sleeve 54 is not limited to this particular embodiment.

In terms of the above example wherein the shank 56 includes at least one slot 82 disposed in the second outer surface 68, the sleeve wall 92 may include at least one finger 108 configured to be received within the slot 82. Each finger 108 has a cross-sectional geometry that mates with the respective slot 82 disposed in the second outer surface 68 of the shank 56. For example, each finger 108 may have side walls disposed at an angle "β" (i.e. the same angle as the angle of the slot side walls shown in FIG. 8). The mating wall surfaces of the sleeve finger 108 and the shank slot 82 permit a sleeve 54 having a CTE greater than that of the shank 56 to expand radially and axially without binding within the shank slot 82, while still maintaining a "fixed" relationship between the shank 56 and the sleeve 54.

The sleeve 54 may be comprised of different materials suitable for different applications. In terms of an application wherein a portion of the fastener body 52 is exposed to a substantially higher temperature than the temperature to which the fastener sleeve 54 is exposed, the sleeve 54 may be comprised of a material capable of maintaining its mechanical properties (e.g., yield strength, etc.) at the lower temperature. Examples of acceptable sleeve 54 materials include, but are not limited to, steel alloys, nickel alloys, non-ferrous metals and alloys, plated or coated metals, plated or coated polymers, or the like, and polymers capable of performing within the application temperature range without degradation.

In some embodiments, the present multi-component fastener 50 may include a retainer 114 operable to retain the male feature 74 of the sleeve 54 within the channel 72 of the shank 56 when the shank 56 and sleeve 54 are assembled. FIG. 3, for example illustrates a retainer 114 disposed in the sleeve channel 112. Non-limiting examples of acceptable retainers 114 include a shrink ring, a split ring assembled by an additive material process (e.g., welding), an additive material bead (e.g. welding), mechanical fastener, etc.

Figure 9:
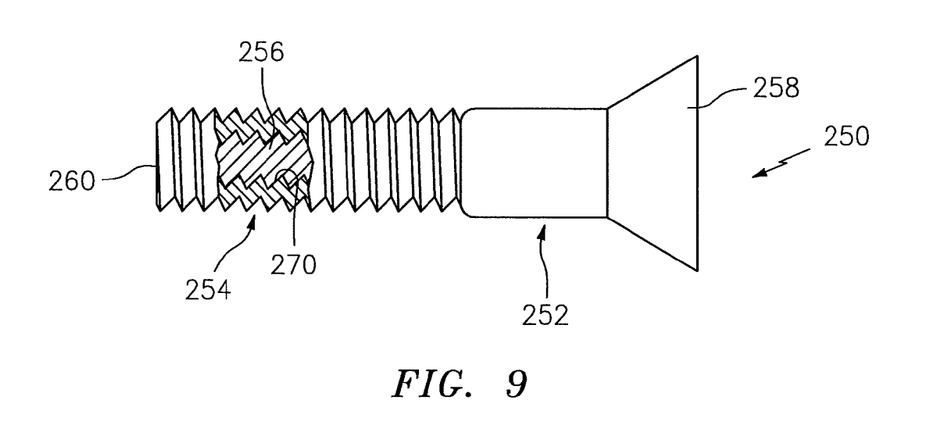
FIG. 9 is a partially sectioned view of an embodiment of the present fastener.

Now referring to FIG. 9, in an alternative embodiment the present multi-component fastener 250 includes a body 252 and a sleeve material 254. The body 252 has a shank 256 that extends lengthwise between a head 258 and a distal end 260, and has a lengthwise extending rotational axis 262. The shank 256 has at threaded portion 270 extending a distance from the distal end 260. The shank threaded portion 270 is configured to allow a layer of sleeve material 254 to be disposed on the shank threads to form an exposed threaded portion (i.e. including the sleeve material 254) of the fastener 250 that can receive a mating threaded nut as will be explained below. The fastener body 252 in this embodiment may be comprised of materials similar to those described above; e.g. high temperature materials, and/or electrically non-conductive materials, etc.

In this embodiment, the sleeve material 254 is disposed on the threaded portion 270 of the shank 256. The sleeve material 254 may be formed on the shank 256 using an additive process (e.g., electro less plating deposition, etc.). The specific formation process may be chosen to suit the specific sleeve material being formed. The sleeve material

254 may be comprised of materials similar to those described above; e.g. steel alloys, nickel alloys, etc. Due to the potential CTE (Co-efficient of Thermal Expansion) mismatch, fasteners constructed with this architecture would be best suited to applications where the primary function is electrical insulation or chemical resistance in a service environment with relatively low temperature excursions.

The foregoing descriptions are exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A multi-component fastener, comprising:
   a body having a shank that extends lengthwise between a head and a distal end, which shank includes a first outer surface, and the body comprises a first material; and
   a sleeve having a wall defined by an outer surface and an inner surface, wherein the inner surface defines an interior cavity, and the wall extends lengthwise between a first end and a second end, and at least a portion of the sleeve outer surface contiguous with the first end is threaded, and the sleeve comprises a second material that is dissimilar to the first material; and
   wherein a portion of the shank including the distal end is disposed within the interior cavity of the sleeve; and
   wherein the sleeve and the shank are fixed to one another in a manner that disallows relative movement between the body and sleeve other than movement attributable to relative thermal expansion or thermal contraction; and
   wherein the sleeve wall is configured to include a plurality of fingers, each finger separated from another finger by a slot disposed within the wall.

2. The fastener of claim 1, wherein the shank includes at least one channel disposed in the first outer surface.

3. The fastener of claim 2, wherein the at least one channel extends a distance around a circumference of the shank.

4. The fastener of claim 2, wherein the sleeve includes a male feature received within the at least one channel.

5. The fastener of claim 4, wherein the fastener further includes a retainer operable to retain the sleeve male feature within the channel disposed in the first outer surface of the channel.

6. The fastener of claim 4, wherein the channel disposed in the first outer surface of the shank has a cross-sectional geometry and the sleeve male feature has a cross-sectional geometry that mates with the cross-sectional geometry of the channel in a manner that allows for relative thermal expansion or thermal contraction without binding there between.

7. The fastener of claim 6, wherein the channel is defined by a first side wall surface, a second side wall surface, and a base wall surface, and the first and second side wall surfaces each extend along a line that is non-perpendicular to a lengthwise extending axis of the body.

8. The fastener of claim 1, wherein the shank includes at least one lengthwise extending slot disposed therein, and one of the sleeve wall fingers is disposed in the slot.

9. The fastener of claim 8, wherein the sleeve wall finger has a cross-sectional geometry and the lengthwise extending slot disposed in the shank has a cross-sectional geometry that mates with the cross-sectional geometry of the finger in a manner that allows for relative thermal expansion or contraction without binding there between.

10. The fastener of claim 1, wherein the first outer surface is disposed at a first diameter relative to a lengthwise extending axis of the body, and the shank further includes a second outer surface disposed at a second diameter relative to the lengthwise extending axis of the body, wherein the second diameter is larger than the first diameter.

11. The fastener of claim 10, wherein the sleeve wall is configured to include a plurality of fingers, each finger separated from another finger by a slot disposed within the wall.

12. The fastener of claim 11, wherein the shank includes at least one lengthwise extending slot disposed in the second outer surface, and one of the sleeve wall fingers is disposed in the slot.

13. The fastener of claim 12, wherein the sleeve wall finger has a cross-sectional geometry and the lengthwise extending slot disposed in the shank second outer surface has a cross-sectional geometry that mates with the cross-sectional geometry of the finger in a manner that allows for relative thermal expansion or contraction without binding there between.

14. The fastener of claim 1, wherein the body first material comprises at least one of a ceramic or a ceramic matrix composite material, and the sleeve second material comprises a metallic material.

15. The fastener of claim 1, wherein the body comprises a polymeric material and the sleeve comprises a metallic material.

16. A multi-component fastener, comprising:
   a body having a shank that extends lengthwise between a head and a distal end, which shank includes a first outer surface, and the body comprises a first material; and
   a sleeve having a wall defined by an outer surface and an inner surface, wherein the inner surface defines an interior cavity, and the wall extends lengthwise between a first end and a second end, and at least a portion of the sleeve outer surface contiguous with the first end is threaded, and the sleeve comprises a second material that is dissimilar to the first material; and
   wherein a portion of the shank including the distal end is disposed within the interior cavity of the sleeve; and
   wherein the sleeve and the shank are fixed to one another in a manner that disallows relative movement between the body and sleeve other than movement attributable to relative thermal expansion or thermal contraction; and
   wherein the shank includes at least one channel disposed in the first outer surface; and
   wherein the sleeve includes a male feature received within the at least one channel;
   wherein the channel disposed in the first outer surface of the shank has a cross-sectional geometry and the sleeve male feature has a cross-sectional geometry that mates with the cross-sectional geometry of the channel in a manner that allows for relative thermal expansion or thermal contraction without binding there between; and
   wherein the channel is defined by a first side wall surface, a second side wall surface, and a base wall surface, and the first and second side wall surfaces each extend along a line that is non-perpendicular to a lengthwise extending axis of the body.

17. A multi-component fastener, comprising:
   a body having a shank that extends lengthwise between a head and a distal end, which shank includes a first outer surface, and the body comprises a first material; and a sleeve having a wall defined by an outer surface and an inner surface, wherein the inner surface defines an interior cavity, and the wall extends lengthwise between a first end and a second end, and at least a portion of the sleeve outer surface contiguous with the first end is threaded, and the sleeve comprises a second material that is dissimilar to the first material; and wherein a portion of the shank including the distal end is disposed within the interior cavity of the sleeve; and wherein the sleeve and the shank are fixed to one another; and wherein the first outer surface is disposed at a first diameter relative to a lengthwise extending axis of the body, and the shank further includes a second outer surface disposed at a second diameter relative to the lengthwise extending axis of the body, wherein the second diameter is larger than the first diameter; and wherein the sleeve wall is configured to include a plurality of fingers, each finger separated from another finger by a slot disposed within the wall.

* * * * *